INVENTOR.
HANS MARTIN
BY
ATTORNEY

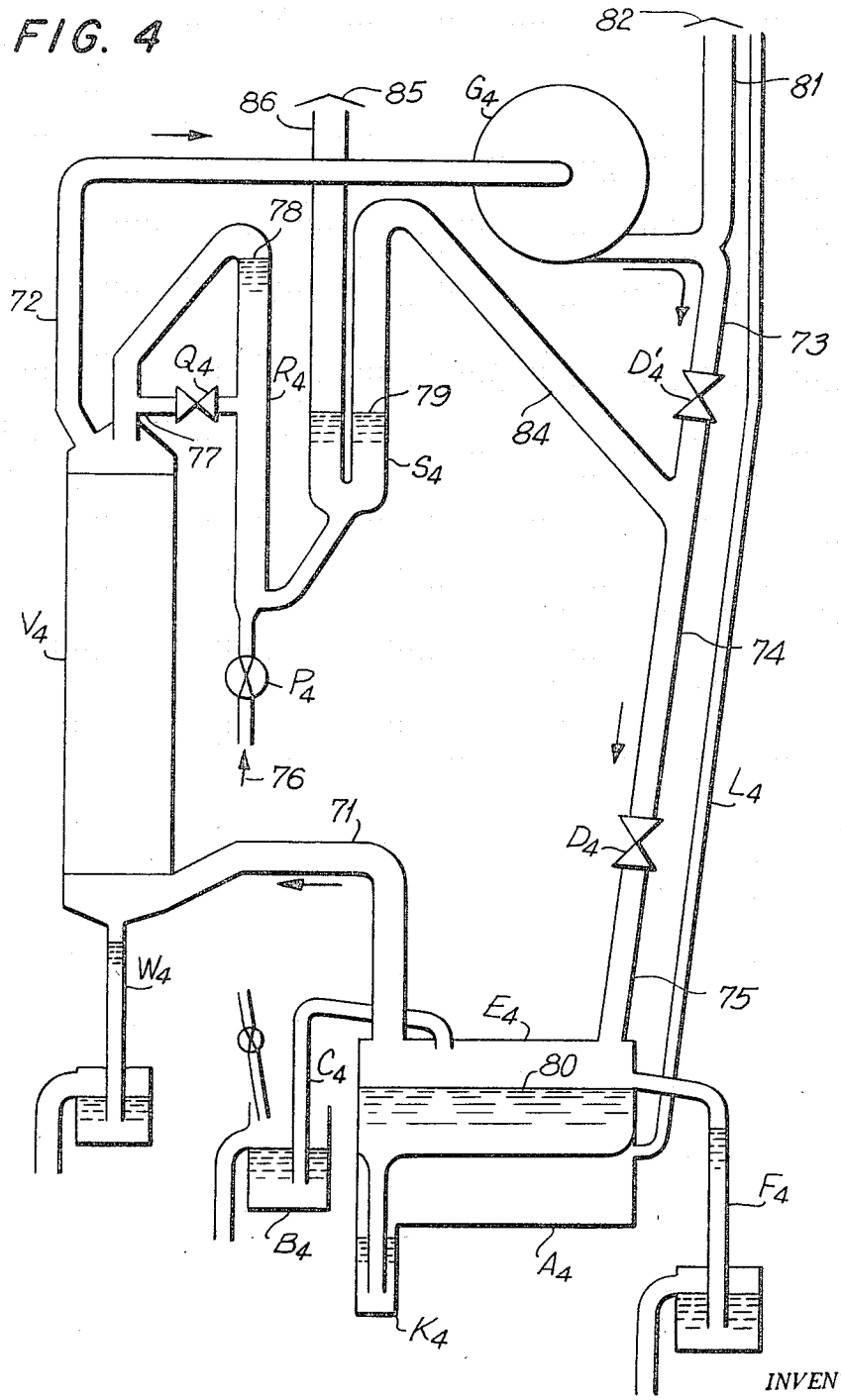

United States Patent Office 3,322,497
Patented May 30, 1967

3,322,497
PROCESS FOR THE PRODUCTION OF DILUTED
CHLORINE DIOXIDE
Hans Martin, Kiel, Germany, assignor to
Paul Henseler, Kiel, Germany
Filed May 18, 1960, Ser. No. 29,977
5 Claims. (Cl. 23—152)

The present invention relates to a method and apparatus for producing and utilizing chlorine dioxide.

Chlorine dioxide is useful as an oxidizing agent, both in gaseous form and in an aqueous form, and is useful in the bleaching of material such as flour or textiles, for the disinfection of water for drinking purposes, and also for producing chlorinated and oxidized compounds, such as chlorites.

Chlorine dioxide, however, is quite explosive and, to prevent explosion, it is desirably diluted with an inert gas, such as air.

In producing diluted chlorine dioxide, and in insuring against production of chlorine dioxide in explosive concentrations, the chlorine dioxide generation is made dependent upon the supply of diluting air into the generator.

The ingredients which are reacted together to form the chlorine dioxide are transferred from a storage container into the generator, in accordance with the supply and pressure of the diluting air, with a predetermined proportionment of air and chlorine dioxide being removed from the generator in non-explosive concentration.

Since the generation or production of chlorine dioxide will increase with increasing temperature in the generator, it is desirable that with a higher temperature a greater amount of diluting air be utilized as an increased factor of safety against the production of explosive mixtures. Generally the rate of production of chlorine dioxide must always be regulated so that a sufficient amount of air at all times will be present to prevent any possibility of formation of explosive mixtures.

Where chlorine dioxide is produced at low temperature to obtain a sufficient yield, successive reaction receptacles are utilized with the liquid reaction mixture being passed successively from one receptacle to the next and with the current of the inert gas or air being passed through these receptacles in a direction opposite to the flow of the chlorine dioxide.

At the same time, to increase the yields, there is a progressively increased application of heat to the successive receptacles to enhance the production of chlorine dioxide in the direction of the flow of the liquid reaction mixture.

In such a successive receptacle procedure, the highest concentration of chlorine dioxide in the chlorine dioxide air mixture is achieved in the generator lowest or in the receptacle having the lowest temperature.

In the process of continuously generating chlorine dioxide which is sufficiently diluted with an inert gas such as air to prevent explosion, the feeding of the reaction agents into the reaction mixture from a supply container into the chlorine dioxide generator is made dependent upon the pressure of the diluting gas or air to assure sufficient dilution at all times.

The introduction of the reaction agents into the chlorine dioxide generator should be regulated in accordance with the pressure of the diluting air and where the chlorine dioxide is then immediately to be used for wet bleaching of textiles or disinfecting of drinking water or other like purposes, the dilution with the air may be controlled in accordance with the absorption of the chlorine dioxide in such liquid processing where the chlorine dioxide is absorbed because of its bleaching or disinfecting properties.

Thus, the amount of diluting gas or air may be regulated not only to avoid the explosive mixture but also in view of the fact that the chlorine dioxide will be absorbed by the wet processing and that this will reduce the amount of air necessary for dilution purposes and will assure that their will not be an occurrence of a dangerously high chlorine dioxide concentration.

A particular feature of the present invention therefore resides in the production and substantially immediate absorption of chlorine dioxide and wet processing with the air or other inert gas vapors or mixtures being regulated so that at no time will the chlorine dioxide be in too great a concentration.

In such a process the chlorine dioxide is subjected to absorption, and residual chlorine dioxide which has been generated and not absorbed may be readily controlled at low pressures by passage of the inert gas or air through the gaseous feeding operation, with regulation so that, depending upon the amount of absorption and the amount of residual chlorine dioxide, the proper dilution concentration is maintained.

It is a particular advantage of the present invention that it is possible to use relatively low pressure of the diluent gas or air in the control of the generation of the chlorine dioxide and the operation may be carried out with open containers and without the need of using pressure vessels and other means for controlling excess or superatmospheric pressures.

In addition, there is the advantage that there will be an avoidance of leaks from the generating apparatus into the surrounding atmosphere, and it is usually more readily possible to handle the liquid flow at such subatmospheric pressures with suitable discharge from one container or receptacle to another at varying levels, so that the generated chlorine dioxide may be drawn off at the highest level of the reaction system or at the highest location of the receptacle receiving the reaction mixture.

Furthermore, the residual diluted chlorine dioxide air mixture, after the removal of the chlorine dioxide thereof in the wet processing, may be returned to the generator so that no chlorine dioxide will be lost and so that the chlorine dioxide concentration may be replenished by further generation.

In the preferred procedure, the combination of diluting gas and chlorine dioxide formed in the generator may be removed by a fan or other gaseous transfer means and then passed up through a tower, downwardly through which the liquid material to be treated or to absorb the chlorine dioxide is passing.

From this tower, after the absorption of chlorine dioxide has taken place, the dilution gases or air, containing more or less of the chlorine dioxide left after the absorption, may then be returned to the generator by means of a throttle or control valve connection at a suitable subatmospheric pressure.

This return of the diluting air or gas, with residual chloride dioxide therein which has not been absorbed, may then be used to sweep over the surface of the liquid reaction mixture in the generator, while an amount of diluting gas may be forced into the bottom of the liquid reaction mixture in the generator.

This residual dilution mixture then will pass up through the liquid reaction mixture in the generator in the form of bubbles to entrain and carry away any chlorine dioxide which may be forming or has been formed within the reaction mixture.

In the preferred method of controlling the production of chlorine dioxide where the chlorine dioxide or mixture is discharged into a column into which liquid is descending through a flow so as to form a contact procedure, it is desirable to use a syphon or cuplike closure to close the air conduit which supplies the generator from the outer atmospheric and provide a release thereof, in accordance with the supply of down-flowing liquid to the content tower.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is an alternative lay-out similar to FIG. 3, also illustrating a control of the generation and dilution of the chlorine dioxide in accordance with the subatmospheric pressure of the dilution air and the flow of the absorbing liquid.

Figure 1:
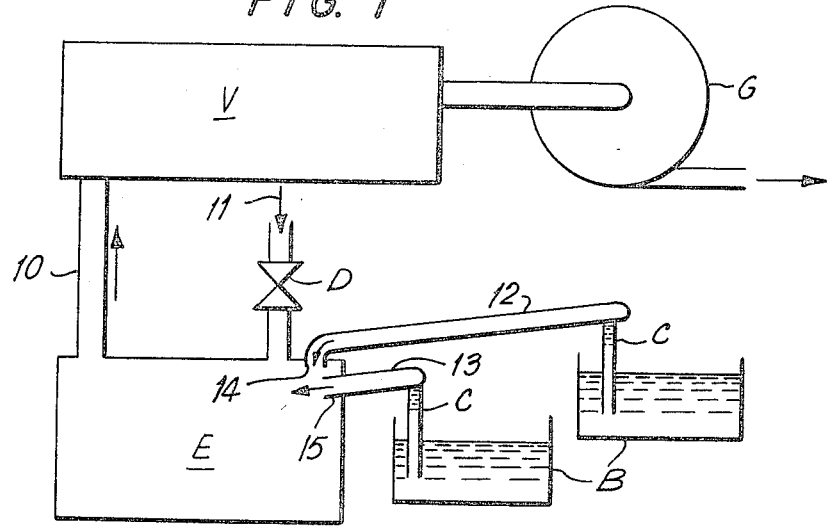
FIG. 1 is a diagrammatic lay-out illustrating the generation of chlorine dioxide controlled in accordance with the subatmospheric pressure of dilution air.

Referring to FIG. 1, the dilution air is drawn in by means of a gas conveyor which may take the form of a centrifugal blower, fan or compresser G.

The suction created by the gas conveyor device G will draw in air through the valve D, which may take the form of a check valve or diaphragm into the chlorine dioxide generator E. The chlorine dioxide-air mixture then passes into the wet processing valve V through the conduit 10.

In the wet processing vessel V there may be suitable wet processing, such as a washing tower, bleaching device or disinfecting arrangement, such as a water chlorinator.

As a result of the throttle at the valve D of the incoming air 11, at subatmospheric pressure will be maintained in the chlorine dioxide generator E.

This subatmospheric pressure maintained in the vessel E will result in causing liquids to be fed into the vessel E under atmospheric pressure.

For example, liquids such as a solution of a chlorate and a solution of a reduction agent may be drawn from the liquid storage containers B through the standpipes C into the flow conduits 12 and 13, to be discharged at 14 and 15 into the generator E.

If the air current or flow is interrupted, the subatmospheric pressure will decrease and the feed to the generator E will be stopped, as will also the generation of chlorine dioxide.

The height of the feed column C, of course, must be so regulated that the atmospheric pressure will force sufficient of the reaction ingredients from the vessels B through the conduits 12 and 13 into the generating vessel E.

The gas conveyer or fan structure G, of course, will only maintain a partial vacuum in the generating vessel E.

Figure 2:
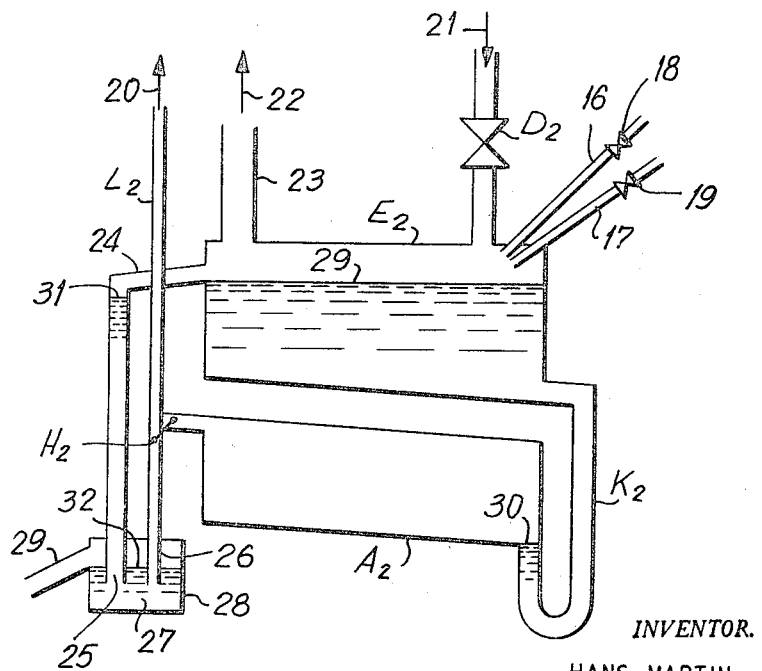
FIG. 2 is an alternative diagrammatic showing, also illustrating the generation of chlorine dioxide, controlled in accordance with the generation of diluting air at subatmospheric pressure.

In the arrangement shown in FIG. 2, there is provided an upper chlorine dioxide generator $E_2$ and a lower displacement vessel A.

The bottom of the generating vessel $E_2$ and the displacement vessel A are connected by means of the syphon-like conduit K.

The chloride dioxide, for example, is generated from the solution of chloric acid and a reduction agent in the generating vessel $E_2$ and these reagents in liquid form are fed through the conduits 16 and 17, past the valves 18 and 19, into the vessel $E_2$. The capacity of the receptacle A is such that the liquid reaction mixture will fill up the displacement vessel A to the overflow H, which is placed at the highest point of the vessel A.

The restricted vertical conduit L will open at 20 to atmospheric pressure. The air will flow in as indicated at 21 past the valve $D_2$, and the mixture of chlorine dioxide and air will flow out, as indicated at 22, through the conduit 23 to a suitable absorption apparatus, where wet processing is taking place.

If the suction on the conduit 23 is interrupted or decreased and if so the supply of air at 21 to the valve $D_2$ is interrupted or decreased, the liquid reaction mixture in the generating vessel $E_2$ will flow into the displacement vessel A and the generation of chlorine dioxide in the vessel $E_2$ will be interrupted or be decreased.

Furthermore, there will be less flow of new reacting chemicals through the conduits 16 and 17 into the generating vessel $E_2$.

Normally, the generating vessel $E_2$ has an overflow 24 to the standpipe F, whereas the overflow H from the displacement vessel A will discharge into the standpipe L. Both the standpipe F and the standpipe L will dip at 25 and 26 into the liquid 27 in the vessel 28, which has an overflow $28a$.

In normal operation, the liquid levels will be approximately maintained at 29 in the vessel $E_2$, at 30 in the vessel A, at 31 in the standpipe F and at 32 in the vessel 28. These levels will correspond to the normal operation and generation of chlorine dioxide or mixtures.

In both FIGS. 1 and 2, the generation of chlorine dioxide will be controlled by the amount of subatmospheric pressure maintained in the generative vessel E or $E_2$.

Figure 3:
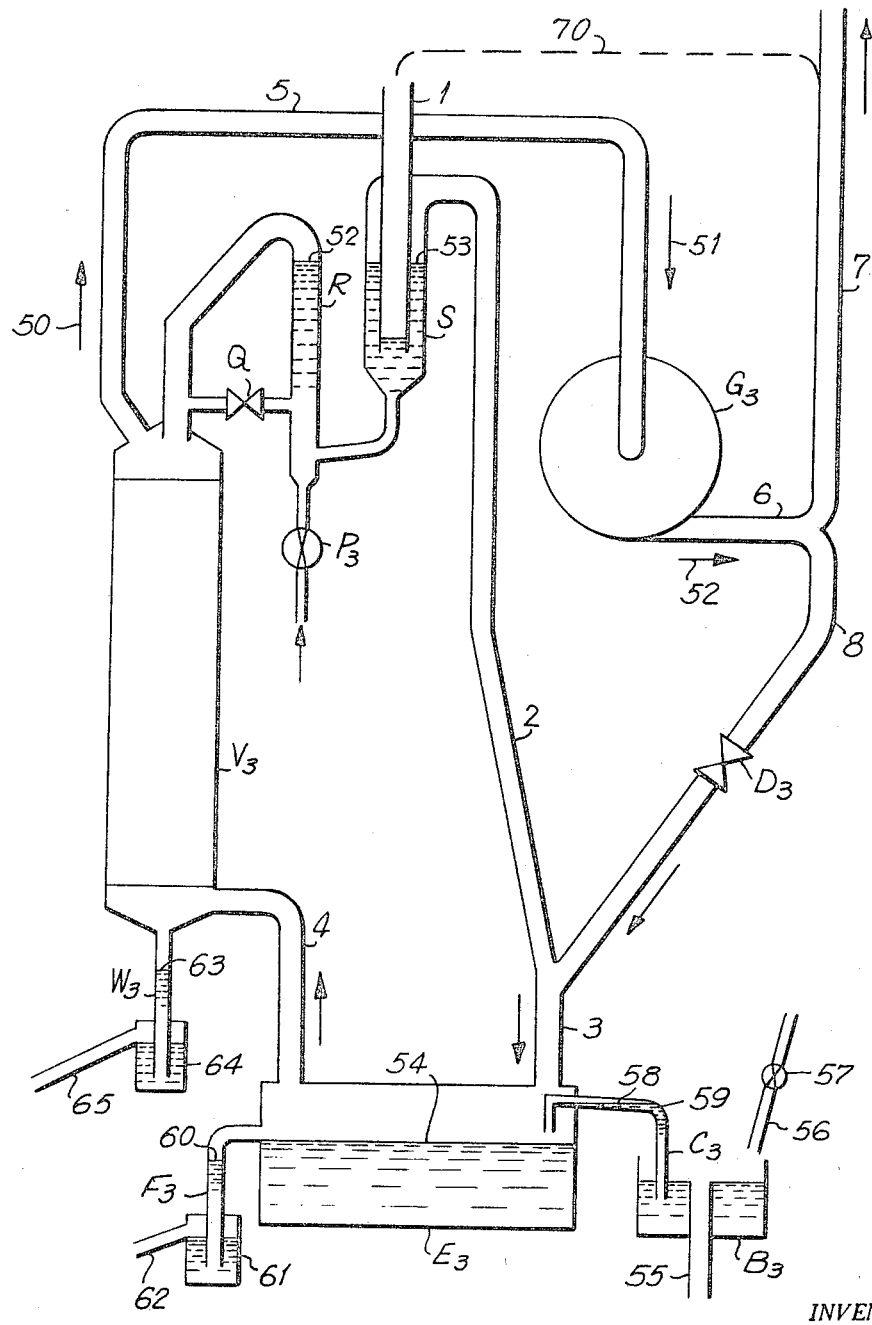
FIG. 3 is a diagrammatic lay-out of a third alternative procedure, in which the degree of dilution of the chlorine dioxide is regulated in accordance with the subatmospheric pressure of the diluting air, as well as the flow of the absorbing liquid in the wet processing.

In FIG. 3, the vessel for the wet absorption process takes the form of a contact tower $V_3$, in which chlorine dioxide is partly absorbed in moving upwardly against the descending liquid, with the residual chlorine dioxide still in the air passing upwardly, as indicated by the arrow 50.

The throttle Q, which may take the form of a tapering tube or regulating valve, is positioned adjacent the top of the processing tower $V_3$.

The liquid feed or water is supplied past the valve or stopcock P and is controlled at the throttle point Q so that the level of liquid or water in the standpipe R and in the syphon closure S, is higher than the throttle point Q.

As the supply past the valve P increases, the water level in the stand-pipe R and the syphon S increases, while, with decreasing flow past the valve P, the level will decrease.

When the supply and lever reach the predetermined value, the syphon S will be closed to passage of liquid and this will be the normal operational condition of the chlorine dioxide generator.

The dilution gases leaving the processing tower $V_3$, as indicated at 50, will be conducted back to the generator $E_3$, past the valve or throttle point $D_3$, as indicated by the arrows 51 and 52, past the suction fan or suction apparatus G.

A circular flow is created as a result of the subatmospheric air pressure maintained by the blower or fan $G_3$.

This subatmospheric pressure is applied to the generating vessel $E_3$ through the processing tower $V_3$, and, as indicated by the arrows 50 and 51, the left side of the apparatus will be under subatmospheric pressure.

The level of liquids indicated at 52 in the stand-pipe R, 53 in the syphon S, 54 in the generating vessel $E_3$, will correspond to normal operation conditions.

Similar levels are also shown in the feed pipe $C_3$ from the supply vessel $B_3$, which has an overflow pipe 55 and a supply pipe 56 with a valve 57.

The level will normally be at 58 in the horizontal oblique portion 59 of the feed pipe $C_3$.

In the overflow tube $F_3$ from the vessel $E_3$ the level will be maintained at 60. This stand-pipe or overflow pipe $F_3$ will extend into the vessel 61 having an overflow pipe 62.

The reaction tower or processing tower $V_3$ will have a depending standpipe W with a liquid level 63. The pipe W will dip into the liquid in the vessel 64, having an overflow 65.

As long as liquid is being fed into the processing tower $V_3$, chlorine dioxide will be supplied to the lower part of said tower through the conduit 4.

However, when the processing liquid is no longer being fed into the processing tower $V_3$ past the valve P and Q, then the obstruction to the flow of atmospheric air through the syphon S will be removed and the subatmospheric pressure will cause air to flow from the conduit 1 and through the conduits 2, 3, 4, 5 and 6 to the blow-off conduit 7 to the outside air or to the roof of the building.

Under these conditions the exhaust fan $G_3$ will draw in outside air to relieve or eliminate the subatmospheric pressure which is maintained in the generating vessel $E_3$ and in the tower $V_3$.

In this arrangement, as shown in FIG. 3, there will be a control of the subatmospheric pressure or air pressure so that when the absorption in the tower $V_3$ is stopped, there will be no longer generation of the chloride dioxide. At the same time air will be circulated through the apparatus so that the blower $G_3$ may continue to operate.

As an alternative procedure in the arrangement of FIG. 3, the flow outwardly through the conduit 7 may be directed backwardly, as indicated by the broken line 70, so that there will be a continuous circulating flow of the inert gas or air when the consumption of the chlorine dioxide is stopped, with only the subatmospheric pressure being eliminated.

This is the preferred arrangement where it is not desired to blow off the air or other diluting gas which may contain quantities of chlorine dioxide.

In such an arrangement it is also possible to circulate the diluting air through the conduit 8 by the blower $G_3$, as well as from the atmosphere or from the conduit 7 by the conduit 2.

The following is an example of the embodiment according to FIG. 3.

The generator $E_3$ is a vessel of earthenware with a capacity of 25 liters, total volume about 50 liters.

The absorption tower $V_3$ is a tower of stainless steel of 3 meter height and 300 mm. diameter filled with a layer 2.5 meters high of Raschig rings of earthenware.

As gas conveyer, a centrifugal blower is used delivering 30 cubic meters of air containing $CO_2$ with some $ClO_2$ past the valve at a subatmospheric of about 500 mm. of a water column.

Two vessels $B_3$ and two conduits $C_3$ (as in FIG. 1) were provided.

One of these was fed with a cold aqueous solution of 640 grams $NaClO_3$ per liter, the other with a warm aqueous solution at 80° C. which contained per liter 190 grams of oxalic acid and 50 grams 96% sulphuric acid.

The two tubes $C_3$ were selected in such lengths and in a diameter that with the liquid level 58 and with the above mentioned sub-pressure in the generator, from the first solution 7 liters in one hour and from the second solution 14 liters per hour flowed into the generator. The generator, after it had been filled with generating fluid up to this overflow $F_3$ was maintained at 80° C. by means of electric heaters (not shown in FIG. 3).

The absorption water was used, flowing at a rate of 1.25 m.³ per hour.

This water ran off below the tower in a volume of about 1.7 grams $ClO_2$ per liter.

The apparatus system P–Q–R–S was operated as follows:

The lower end of the tube 1 which dipped into the syphon closure was placed 380 mm. higher than the valve Q.

The valve Q was so regulated that the water supply which was controlled by means of valve P reached a level 53 in standpipe R at 980 mm. higher than the valve Q.

An analysis of the gases entering the tower $V_3$ from below yielded a percentage content by volume of $ClO_2$ of about 3.

At the upper end of the tower $V_3$, the $ClO_2$ content of the air was about 0.5% by volume.

The circulating air contained also a greater amount of $CO_2$ which is found in the generator aside from $ClO_2$.

The $CO_2$ content was not more precisely determined.

If the water supply was reduced from 1.25 m.³ to 0.75 m.³ then the tube 1 would not dip into the water and the subatmospheric pressure in the generator was almost totally removed.

The air stream through the generator also rose sharply and the supply of the chemical solution discontinued.

In the apparatus shown in FIG. 4, the generator $E_4$ is connected to the contact tower $V_4$ by means of the conduit 71.

The tower $V_4$ is connected by the conduit 72 to the exhaust fan or subatmospheric pressure producing means $G_4$.

$G_4$ will force the gases to the valve $D'_4$ through the conduits 73 and then down through the conduit 74 to the valve $D_4$ and finally through the conduit 75 to the generator $E_4$.

The feed of liquid to be processed will be, as indicated by the arrow 76, past the valve $P_4$ and the valve $Q_4$ and the conduit 77 to the absorption tower $V_4$. The valves $P_4$ and $Q_4$ will regulate the liquid level as indicated at 78 in the standpipe $R_4$ and at the level 79 in the syphon or barrier $S_4$.

These levels, as indicated at 78 and 79 in the standpipe $R_4$ and the syphon $S_4$, as well as the level 80 in the generator $E_4$, correspond to normal operation.

The subatmospheric pressure in the generator $E_4$ is regulated by the valve $D_4$, and not particularly by the valve $D'_4$.

Between the blower $G_4$ and the valve $D'_4$ there will be a branch tube 81 which connects at 82 to the outer air. The other branch tube 73 leads past the valve $D'_4$ to the branch point 83 and to the conduit 84.

The conduit 84 is connected to the hydrostatically controlled syphon operator $S_4$.

When this operator $S_4$ is opened, there is a sucking connection to the outer air at 85 through the upper standpipe 86.

As a result, fresh air will be drawn in through the pipe 86 and past the operator $S_4$ and down through the conduits 84 and 74 into the generator $E_4$. This air will then pass through the generator $E_4$ through the pipe 71 into the tower $V_4$ and to the outside air, through the conduit 81.

Only a small part of the diluting air will be conveyed by the suction device $G_4$ in the circle through the generator $E_4$ and the tower $V_4$.

In the arrangement of FIG. 4, in contrast to the arrangement of FIG. 3, the charging of the inert gas with chlorine dioxide is not stopped when the chlorine dioxide consumption in the tower $V_4$ is stopped. This is because the diminishing pressure is maintained as long as the suction fan $G_4$ is in operation.

The safeguard in the arrangement of FIG. 4 against the stoppage of absorption in the tower $V_4$ merely consists of stopping the return of the inert gas.

In the arrangement as shown, the incoming air will flow over the surface of the reaction liquid mixture in the generators E to $E_4$.

It is also possible and desirable to increase the generation of chlorine dioxide to introduce a part of the diluting air at the bottom of the generator and permit it to bubble up through the reaction liquid therein in order to entrain and remove any chlorine dioxide formed within the reaction solution.

In FIG. 4 the reaction generator $E_4$ is supplied with a displacement vessel $A_4$ and the flow connection $K_4$, which function the same as described in FIG. 2.

This is also true of the standpipes $F_4$ and $W_4$ and the supply vessel $B_4$ and the supply conduit $C_4$, which function as do similarly labeled parts in FIGS. 1, 2 and 3.

As an illustrative example for the embodiment of FIG. 4, the generator $E_4$ was a vessel of earthenware with a total volumetric capacity of 55 liters. The total volumetric content was 100 liters.

Below the generator $E_4$ there was located also a discharge container with a total volumetric content of 55 liters. The containers were connected together by the syphon $K_4$.

This absorption tower $V_4$ of polyvinyl chloride plastic of 450 mm. diameter which was filled with Raschnig rings of earthenware for about 4 meters in height.

As gas conveyer $C_4$ there was used a centrifugal blower of greater capacity than in FIG. 3.

The supply of chemicals flowed by way of two tubular conduits $C_4$ from two supply vessels $B_4$.

In the above example, the tubular conduits between the apparatus parts are controlled by valves $D_4$ and $D'_4$ as appears from FIG. 4.

Moreover a branch tubular conduit as provided between the valves $D_4$ and $D'_4$ directly in front of the throttle $D_4$, which opened into the lower part of the generator $E_4$ (not shown in FIG. 4).

This permitted a part of the stream of circulating gases to bubble up through the generator, whereby a more rapid and more complete removal of $ClO_2$ is achieved from the generator solution.

The branch conduit air stream was regulated by valve to about 8 m.³ per hour.

One of the chemical solutions $NaClO_3$ was the same as in the above mentioned example of FIG. 3.

As the second chemical solution reduction, an aqueous solution was taken, which contained per liter, 415 cm.³ of hydrochloric acid of density of 1.2 and 500 grams of 96% sulphuric acid.

The solution was not heated.

In this experiment a subatmospheric pressure resulted in the generator and absorber of about 700 mm. of water column.

At the valve $D_4$ a valve opening of 20 mm. diameter and at the valve $D'_4$ one such of 38 mm. diameter were maintained.

The throttle $D'_4$ effected only a slight drop of pressure of about 25 mm. water column.

Under these conditions of operation, about 70 m.³ of gases circulated per hour.

There was drawn into the generator in one hour, 14 liters of the $NaClO_3$ solution and 28 liters of the

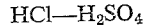

$HCl—H_2SO_4$ solution.

The generator fluid $E_4$ was maintained at 60° C. in this example.

The absorption water was supplied by way of valve $P_4$ at a rate of 900 liters per hour.

In this case a $ClO_2$ solution was produced with a content of 13.8 grams available chlorine per liter.

The arrangement P–Q–R–S was dimensioned as follows:

Overflow level 87 of the stand tube $R_4$ was 800 mm. about the valve $Q_4$.

The level 88 branch in standpipe $R_4$ leading up to syphon $S_4$ was 800 mm. below valve $Q_4$.

The level 89 in the lower end of the U-tube $S_4$ was 350 mm. below valve $Q_4$.

The throttle $Q_4$ was so set that the level 78 in the stand tube $R_4$ was about 700 mm. above valve $Q_4$.

At the lower end of the absorption tower there was about 4.4% $ClO_2$ by volume. At the upper about 2.5% by $ClO_2$ by volume.

Free chlorine was a by-product in the example and which was less absorbed by water than the $ClO_2$ and it was present in a concentration of about 20% by volume in the circulating air.

If the velocity of the water supply was reduced by about 30%, the water level in the legs of the tubes of the syphon $S_4$ dropped below the lever 89 and the diluting air was no longer drawn through the valve $D'_4$ through syphon $S_4$ and the air drawn in was expelled through the conduit 81.

Simultaneously the percentage content of $ClO_2$ in the gases in the lower end of the tower dropped below the desired normal content.

If the centrifugal blower was turned off the subatmosphere pressure dropped rapidly and feed of chemicals out of level container $B_4$ ceased and the generator fluid escaped from the discharge vessel $A_4$.

The $ClO_2$ which subsequently escaped from the generator fluid collected in the narrow tube conduit L having a diameter of 15 mm. as against 80 to 100 mm. of the remaining tube conduits and was conveyed by means of the latter into the air.

An increased concentration of $ClO_2$ in the conduit L however involves no danger whatsoever because of the low amount of gas in the narrow bore thereof.

In addition to the continuous feed, as described in FIGS. 1 to 4, it is also possible to accommodate feeding the wet processing absorption vessels V to $V_4$ by batch processes.

This is accomplished by varying the residence or restriction to the inward flow of the diluting air as it is passed through the absorption vessels V to $V_4$.

The resulting effect will be variations in the subatmospheric pressure, which will depend upon the feed of the diluting air and will be associated with a pressure control water seal.

An many changes could be made in the above method and apparatus for the production and utilization of chlorine dioxide, and many widely different embodiments of this invention could be made without departure from the scope of the claims, it is intended that all matter contained in the above description shall be interpreted as illustrative and not in a limiting sense.

Having now particularly described and ascertained the nature of the invention, and in what manner the same is to be performed, what is claimed is:

1. In a system for the production and substantially immediate consumption of explosive chlorine dioxide in which the chlorine dioxide is diluted with an inert gas so as to provide a non-explosive mixture thereof, said system being of the type having a generating stage and an absorption stage with the mixture of the chlorine dioxide and diluent passing directly from the generating stage to the absorption stage; steps of providing a liquid reaction mixture for producing chlorine dioxide in the generating stage, drawing the chlorine dioxide from the generating stage and through absorption stage by application of a suction to draw off residual gases at the end of the absorption stage and thus applying a subatmospheric pressure to the system supplying the gaseous diluent to the generating stage by causing it to flow into said stage by application of the subatmospheric pressure to dilute the chlorine dioxide while restricting the supply of the diluent gas so as to maintain the subatmospheric pressure, providing a supply of reagents to make up the reaction mixture, causing said reagents to flow into said reaction mixture by said subatmospheric pressure and causing discontinuance of said production of chlorine dioxide by releasing subatmospheric pressure in said generating stage.

2. The system of claim 1, recirculating the mixture of residual gases obtained at the end of the absorption stage to the supplying of the gaseous diluent.

3. The system of claim 1, dumping the reaction mixture upon release of the subatmospheric pressure and to stop the generation of further chlorine dioxide.

4. The system of claim 1, flowing the diluent gas through and over the reaction mixture to aid in the removal of any chlorine dioxide formed.

5. The system of claim 1, supplying a counterflowing liquid to said absorption stage to flow counter to the chlorine dioxide in the absorption stage.

References Cited

UNITED STATES PATENTS

| | | | |
|---|---|---|---|
| 2,388,202 | 10/1945 | Woodward | 23—152 |
| 2,451,826 | 10/1948 | Haller | 23—152 |
| 2,481,240 | 9/1949 | Rapson et al. | 23—152 |
| 2,481,241 | 9/1949 | Rapson et al. | 23—152 |
| 2,598,087 | 5/1952 | Wayman et al. | 23—152 |
| 2,654,656 | 10/1953 | Evans | 23—152 X |
| 2,704,703 | 3/1955 | Hesson | 23—260 |
| 2,837,414 | 6/1958 | Williamson et al. | 23—152 X |

FOREIGN PATENTS 1,088,935   9/1960   Germany.

OSCAR R. VERTIZ, *Primary Examiner.*

MAURICE A. BRINDISI, *Examiner.*

E. STERN, *Assistant Examiner.*